Patented Jan. 22, 1929.

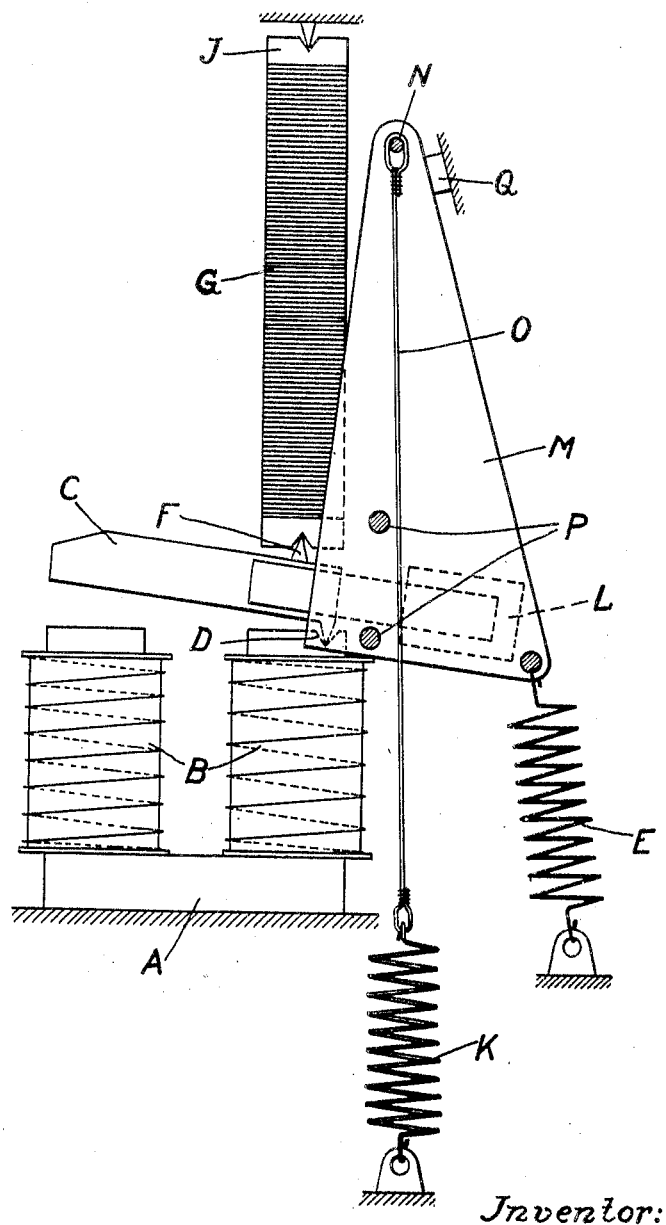

1,700,040

UNITED STATES PATENT OFFICE.

HUGO GROB, OF BERLIN, GERMANY.

DEVICE FOR REGULATING ELECTRIC VOLTAGES.

Application filed October 3, 1925, Serial No. 60,157, and in Germany October 9, 1924. Renewed June 16, 1928.

This invention relates to electrical regulating apparatus and, with regard to its more specific features, to electrical regulating apparatus wherein are employed pressure-responsive variable resistance elements.

One of the objects of the invention is to provide an apparatus of the above nature which is practical and highly efficient. Another object is to provide apparatus of the above nature capable of operating with a high degree of accuracy. Another object is to provide apparatus of the above nature wherein the change required in the functions being regulated in order to actuate the apparatus is reduced to a minimum. Another object is to provide such apparatus wherein the moving parts are substantially balanced throughout the range of operation. Other objects will be in part obvious or in part pointed out hereinafter.

The invention accordingly consists in the features of construction, combinations of elements, and arrangement of parts as will be exemplified in the structure to be hereinafter described and the scope of the application of which will be indicated in the following claims.

In the accompanying drawing there is shown somewhat diagrammatically one of the various possible embodiments of the invention.

Referring now to the drawing in detail, there is represented an electrical regulating apparatus adapted to control and maintain constant a function of the output from a source of current which may be, for example, a generator or a storage battery. The function to be controlled or regulated may be either voltage or current. For simplicity of description it will be assumed that the source of current, the output of which is to be regulated herein, is a shunt wound variable speed generator such, for example, as employed in car lighting, and that the regulator is a voltage regulator.

In the drawing there are shown a pair of coils B which in this instance are voltage coils and which, it will be understood, are connected across the terminals of the generator. These coils B are provided with fixed cores forming a part of the electromagnet frame A. It will be understood, however, that other arrangements could be employed, for example, the voltage coils could be provided with a movable core, movable in response to variations in the magnetic field of the coils.

In series with the shunt field coil of the generator to be regulated is placed a variable resistance device in the form of a carbon pile G, the resistance of which varies inversely with the pressure thereon. The output of the generator may be controlled by controlling the field excitation thereof, that is, by controlling the current flow through the field winding by means of the variable resistance element G.

In order to accomplish this control automatically to maintain the voltage of the generator substantially constant, a mechanism is provided which is movable in response to variations in the magnetic field of the voltage coils B and which upon movement changes the compression of the resistance device G. The movement of the mechanism in response to an increase in voltage and consequent strengthening of the magnetic field of the coils is opposed by a spring. The force of the spring upon the mechanism is in a direction tending to increase the pressure upon the carbon pile G, and hence tending to increase the field excitation of the generator. Thus, through such mechanism, a form of which will be described presently, an increase in generator voltage and hence in the strength of the coils P increases the resistance of the carbon pile G and weakens the generator field, tending to again lower the generator voltage; a decrease in generator voltage and hence in the field strength of the coil B decreases the resistance of the carbon pile G and strengthens the generator field, tending to raise the generator voltage.

The result desired to be achieved by this regulation is to keep the generator voltage constant. However, it will be noted that in order to actuate the regulating mechanism some change is required to take place in the generator voltage, a movement of the regulating mechanism being required each time the generator starts to change. The greater the resistance against movement of the parts to be moved, the greater is this voltage change required in order to effect movement of the parts. It is one of the dominant aims of this invention to provide means whereby this resistance against movement of the parts of the mechanism is reduced to a minimum and so maintained throughout the range of action of the regulator.

Referring again to the drawing, there is shown a lever C which is pivoted preferably upon a knife edge D and is positioned to be attracted toward the electromagnet frame A by the magnetic field of the coils B. Above the lever C is positioned the carbon pile G which bears at its upper end J against a knife edge and rests at its lower end upon a knife edge F of the lever C. The mounting upon knife edges as described provides for a substantially frictionless movement of the parts.

Secured to the lever C is a plate M which presently will be described fully. A spring E acts upon the lever C in opposition to the pull thereon of the coils B. This spring, in the embodiment shown, is conveniently attached to the plate M. The lever C is preferably provided with a counter-weight L so that, when resting free, it is substantially balanced upon its knife edge D.

The spring E tends to swing the lever C upon its knife edge D in a direction to raise the knife edge F and compress the carbon pile G. A change in voltage of the generator, resulting in a change in the magnetic field of the coils B, causes a movement of the lever C in one direction or the other to change the compression of the carbon pile G. The parts are so proportioned that, as has been described above, the regulation achieved is adapted to maintain the generator voltage substantially constant.

The plate M is provided adjacent its upper end with a pin N over which is hooked a cable O. A spring K acts through this cable O and the pin N and thus, pulling downwardly upon the lever C at the right of its pivot D, tends to compress the carbon pile G. It will be seen that the spring K acts upon the carbon pile through an arm of force determined by distance between a vertical line through the pin N and a vertical line through the pivot D. As the right-hand end of the lever C swings downwardly, that is, as the compression of the carbon pile G increases, this arm of force increases and hence the force exerted by the spring K upon the carbon pile increases. The parts may be so proportioned and the points F, D and N may be so positioned that the force exerted by the spring K upon the carbon pile G continually counteracts and counter-balances the reactive force exerted by the carbon pile. This reactive force increases as the compression of the carbon pile increases and, as will be seen, the force exerted upon the carbon pile by the spring K correspondingly increases. Preferably suitable stops P are provided to limit the approach of the cable O toward the pivot point D of the lever C.

From the above it will be seen that the reactive force exerted by the carbon pile G against the regulating movement of the lever C is continually counter-balanced. The lever C, in its movements in response to variations in the magnetic field of the coils B is required to exert very little or no pressure at all upon the carbon pile in order to effect the required change in resistance thereof. The characteristics of the spring E and of the coils B may be proportioned substantially without regard to the force required to compress the carbon pile. The coils B may therefore be of only small size and strength, requiring a minimum of current. A very slight change in voltage of the generator, in fact an almost negligible change, will effect the desired actuation of the regulating mechanism and thus regulation of the greatest possible accuracy is achieved.

As many possible embodiments may be made of the above invention and as many changes might be made in the embodiment above set forth, it is to be understood that all matter hereinbefore set forth or shown in the accompanying drawing, is to be interpreted as illustrative and not in a limiting sense.

I claim as my invention:

1. In electrical regulating apparatus, in combination with a source of current, a carbon pile adapted to control a function of the output from said source, a coil, a lever movable in response to variations in the magnetic field of said coil and connected to affect said carbon pile, a spring acting upon said lever in opposition to the pull of said coil thereon and adapted with said coil to control the compression of said carbon pile so as to maintain said output function substantially constant, and a second spring acting upon said lever and tending therethrough to compress said carbon pile, said last spring acting upon said carbon pile through a varying arm of force as said lever swings and being adapted substantially to counterbalance the reactive force of said carbon pile throughout its range of compression.

2. In electrical regulating apparatus, in combination with a source of current, a carbon pile adapted to control a function of the output from said source, a coil, a lever movable in response to variations in the magnetic field of said coil and connected to affect said carbon pile, a spring acting upon said lever in opposition to the pull of said coil thereon and adapted with said coil to control the compression of said carbon pile so as to maintain said output function substantially constant, said spring tending continually to compress said carbon pile, and a second spring acting upon said lever and tending also to compress said carbon pile, said last spring being connected to said lever so that the arm of force through which it acts upon said carbon pile varies as the lever swings and increases as the compression of the carbon pile increases.

3. In electrical regulating apparatus, in combination with a source of current, a carbon pile adapted to control a function of the output from said source, a coil, a lever movable in response to variations in the magnetic field of said coil and connected to affect said carbon pile, a spring acting upon said lever in opposition to the pull of said coil thereon and adapted with said coil to control the compression of said carbon pile so as to maintain said output function substantially constant, an arm extending outwardly from said lever and transversely to the axis about which it pivots, and a spring connected to said arm and acting therethrough and through said lever tending to compress said carbon pile, the arm of force through which said last spring acts upon said carbon pile varying as said lever swings.

4. In electrical regulating apparatus, in combination with a source of current, a carbon pile adapted to control a function of the output from said source, a coil, a substantially balanced lever movable in response to variations in the magnetic field of said coil and connected to affect said carbon pile, a spring acting upon said lever in opposition to the pull of said coil thereon and adapted with said coil to control the compression of said carbon pile through said lever so as to maintain said output function substantially constant, and a second spring connected to said lever and acting therethrough through a varying arm of force tending to compress said carbon pile, said arm of force increasing as the lever moves to compress said carbon pile.

5. In electrical regulating apparatus, in combination with a source of current, a carbon pile adapted to control a function of output from said source, a coil, a pivoted lever having a portion on one side of its pivot positioned between said carbon pile and said coil and adapted to compress said carbon pile, said coil tending to swing said lever to relieve the compression, a spring acting upon said lever in opposition to said coil and adapted with said coil to control the compression of said carbon pile so as to maintain said output function substantially constant, a projecting arm on said lever adjacent said pivot, and a second spring connected to said arm and acting through a line passing adjacent to said pivot tending to swing said lever to compress said carbon pile.

6. In electrical regulating apparatus, in combination with a source of current, a carbon pile adapted to control a function of the output from said source, a coil, a lever movable in response to variations in the magnetic field of said coil and connected to affect said carbon pile, a spring acting upon said lever in opposition to the pull of said coil thereon and adapted with said coil to control the compression of said carbon pile so as to maintain said output function substantially constant, and a second spring acting upon said lever tending to compress said carbon pile, said last spring acting along a line which moves toward and away from the pivot of said lever as said lever moves to respectively relieve and increase the pressure upon said carbon pile.

7. In electrical regulating apparatus, in combination, a pressure controlled variable resistance element, a coil, a swinging armature connected to vary the compression of said resistance element as it swings and positioned to be moved by the magnetic field of said coil in a direction to relieve said compression, an arm connected to swing with said armature and projecting outwardly in a direction transversely of the axis about which the armature swings, and spring means connected to said arm adjacent the outer end thereof and acting thereon tending to swing said armature to increase the compression of said resistance element, the force exerted by said spring acting in a direction approximately lengthwise of said arm.

8. In electrical regulating apparatus, in combination, a pressure controlled variable resistance element, a coil, a swinging armature connected to vary the compression of said resistance element as it swings and positioned to be moved by the magnetic field of said coil in a direction to relieve said compression, an arm connected to swing with said armature and projecting outwardly in a direction transversely of the axis about which the armature swings, a flexible cable connected to said arm adjacent the outer end thereof and extending in a direction approximately lengthwise thereof, and a spring acting through said cable tending to swing said armature in a direction to increase the compression of said resistance element.

9. In electrical regulating apparatus, in combination, a pressure controlled variable resistance element, a coil, a swinging armature connected to vary the compression of said resistance element as it swings and positioned to be moved by the magnetic field of said coil in a direction to relieve said compression, and spring means tending to swing said armature in a direction to increase the compression of said resistance element, said spring acting upon said armature through a part spaced outwardly from the armature axis in a direction approximately lengthwise of the direction of the pull of said spring whereby a relatively small swing of said armature relatively greatly changes the arm of force through which said spring acts thereon.

In testimony whereof I have affixed my signature.

HUGO GROB.